July 19, 1966 K. M. HALEY ETAL 3,261,514
FEED HOPPER FOR TABLE FEEDER
Filed June 29, 1964 4 Sheets-Sheet 1

INVENTOR.
Kenneth M. Haley
BY Richard L. Reed
Meyer, Baldwin, Doran & Egan
ATTORNEYS July 19, 1966   K. M. HALEY ETAL   3,261,514
FEED HOPPER FOR TABLE FEEDER
Filed June 29, 1964   4 Sheets-Sheet 2

INVENTOR.
Kenneth M. Haley
BY Richard L. Reed
Meyer, Baldwin, Doran & Egan
ATTORNEYS July 19, 1966
K. M. HALEY ETAL
3,261,514
FEED HOPPER FOR TABLE FEEDER
Filed June 29, 1964
4 Sheets-Sheet 3
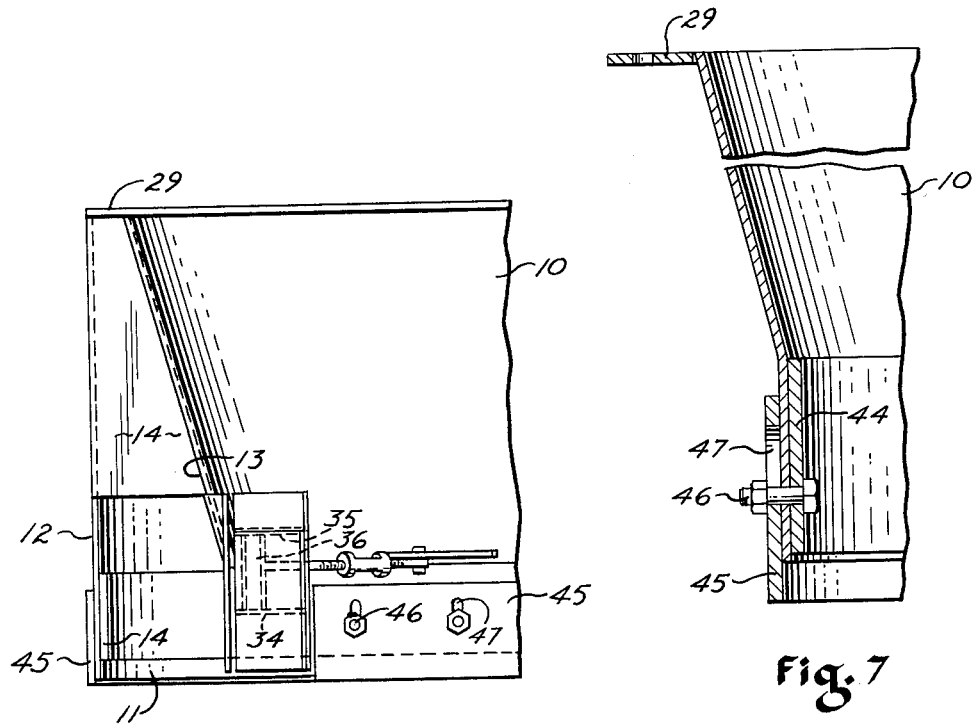
Fig. 5
Fig. 7
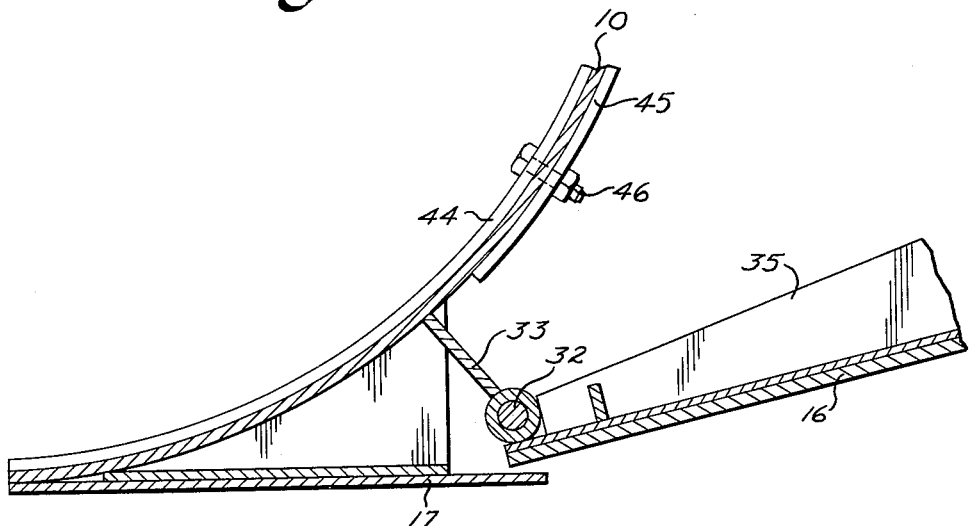
Fig. 6
INVENTOR.
Kenneth M. Haley
BY Richard L. Reed
Meyer, Baldwin, Doran & Egan
ATTORNEYS INVENTOR.
Kenneth M. Haley
BY Richard L. Reed
Meyer, Baldwin, Doran & Egan
ATTORNEYS

United States Patent Office 3,261,514
Patented July 19, 1966

3,261,514
FEED HOPPER FOR TABLE FEEDER
Kenneth M. Haley and Richard L. Reed, Silver Bay, Minn., assignors to Reserve Mining Company, Silver Bay, Minn., a corporation of Minnesota
Filed June 29, 1964, Ser. No. 378,610
8 Claims. (Cl. 222—410)

This invention relates to a novel and improved discharge hopper such as is used to control and direct discharge of comminuted material from a bin above the hopper to a table feeder or other movable conveying means immediately below the hopper.

In one exemplification of the invention the hopper is used for controlling the discharge of moist, sticky, powdered ore concentrate to a table feeder and then to a balling drum in which the material is formed into balls or pellets. Such moist concentrate has a tendency to adhere to the inner walls of bins and hoppers so as to eventually diminish the efficient flow of the material especially if there are inner offsets in the hopper such as characterized hoppers previously used in the prior art. This was because the discharge opening was arranged radially of the table feeder so as to permit tangential flow at the bottom of the hopper, and the gate or port structure required an inward offset of the hopper wall, and an interior shelf to define the upper wall of a usually rectangular opening, upon which shelf the material progressively built up, An object of the present invention is to provide a novel and improved discharge hopper design which provides an outlet port formed in the wall of the hopper so as to provide for an output flow therefrom that is at substantially a right angle to a radius line passing through the vertical axis of the said hopper.

A further object of the invention is to provide an approximately frusto-conical hopper the wall thereof having a vertically extending spiral portion which is provided with an exit opening, the opposed side edges being radially inwardly displaced at the bottom, the hopper wall being thereby inwardly and downwardly convergingly inclined from a maximum inclination to the vertical at the inwardly inclined edge end to a minimum inclination to the vertical at the outward edge end.

A further object of the invention is to provide a hopper of the type defined in the last two preceding paragraphs wherein the lower edge defines a spiral contour to provide a discharge opening between the free ends of the spiral, the opening being disposed to discharge material tangentially therefrom or in other words in a direction that is substantially at a right angle to a radius line passing through the vertical axis of the hopper onto a rotating table feeder, although of course it could be a conveyor of some other type, such as an endless belt.

Other objects and advantages will be apparent from a study of the following drawings illustrating two embodiments of the invention wherein FIG. 1 is a perspective view of the hopper, on a reduced scale.

FIG 2 is a side elevational view of the hopper, bin, and table feeder, the bin and table feeder not being fully shown.

FIGS. 3 and 4 are sectional views taken respectively on the lines 3—3 and 4—4 of FIG. 2.

FIG. 5 is a view in side elevation, as seen from the line 5—5 on FIG. 3 showing the discharge opening.

FIG. 6 is an enlarged fragmentary view in section, showing the hinged suspension of the plow.

FIG. 7 is an enlarged sectional detail view of the lower edge of the hopper, taken on the line 7—7 of FIG. 3, showing the adjustable reinforcing collar at the lower edge of the hopper.

Figure 1:
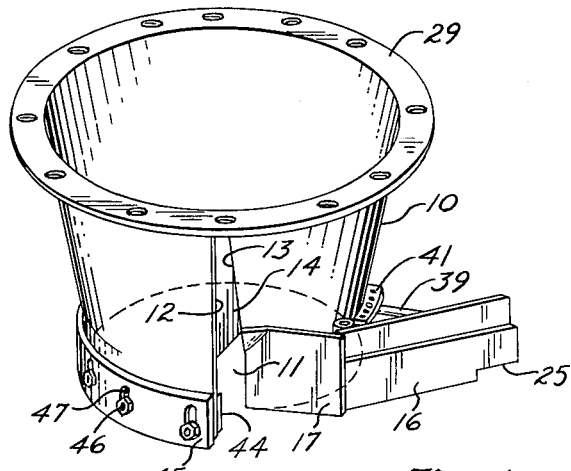

Referring now to the drawings, and for the time being to FIGS. 1 to 4, FIG. 1 shows in perspective a hopper 10 designed in accordance with the present invention being generally spiral-shaped in configuration and having at its lower edge a trapezoidal shaped exit opening 11 formed by the downward radial divergence of the two wall edges 12 and 13 defining said opening. The opening can be closed at its upper end by a plate 14.

Figure 4:
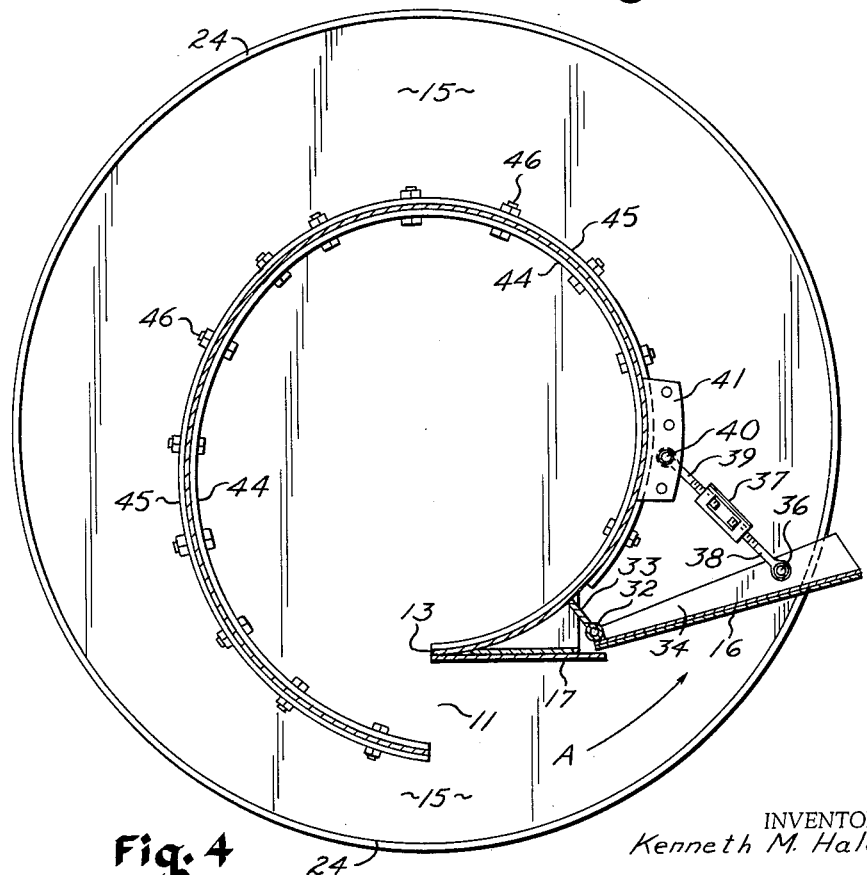
Figure 3:
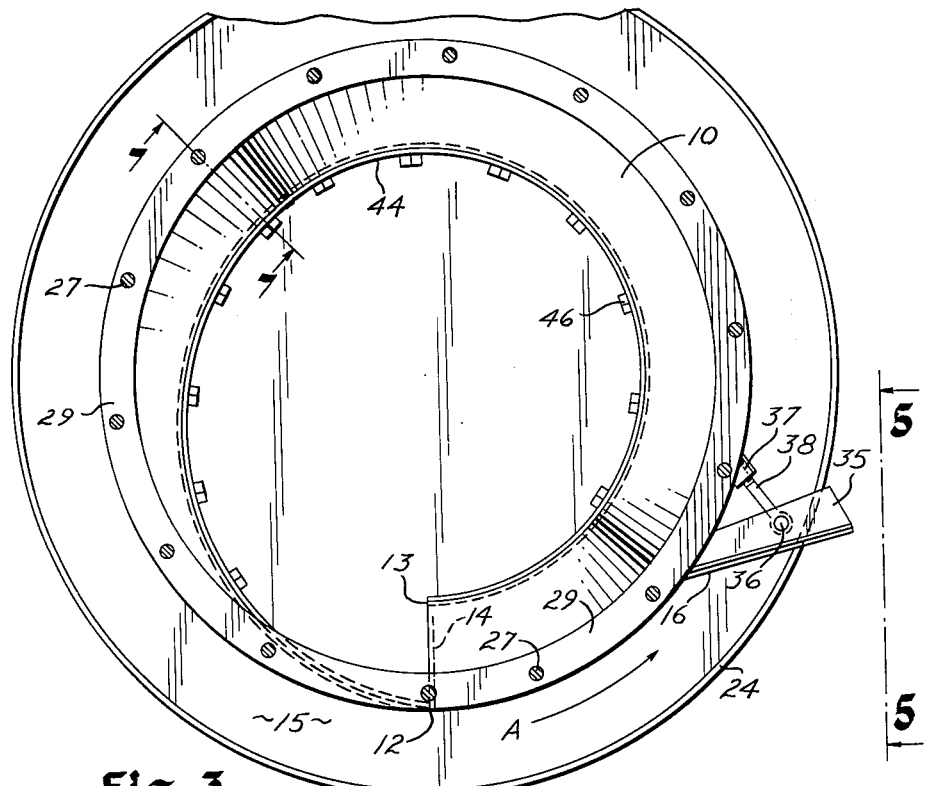
Figure 2:
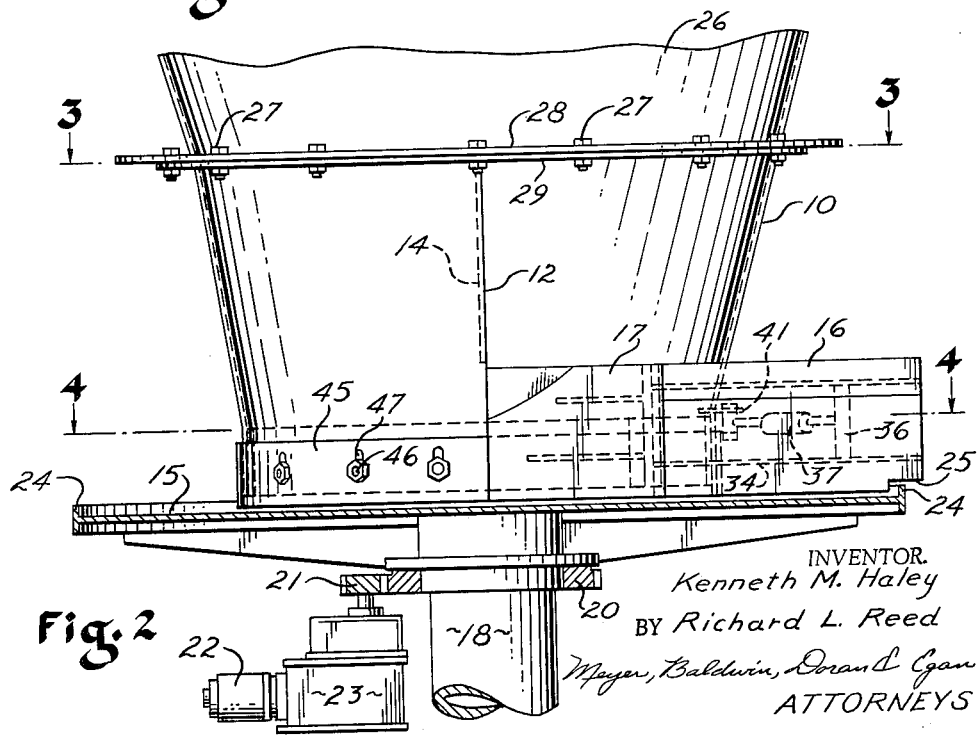

Immediately beneath the hopper we show a rotatable disc 15, usually termed a table feeder, as shown in FIGS. 2–4. It is rotatable in the direction of the arrows A so as to keep the opening 11 continually cleared of the material issuing tangentially from the hopper. An adjustable plow or scraper 16, the structure and adjustment of which will be more fully described later, is disposed transversely of the table feeder to intercept conveyed material and guide it to a predetermined location where it is scraped from the feeder into or onto any further conveying means. A fixed baffle plate 17 carried on the hopper wall (FIGS. 1, 4 and 6) prevents moving material from getting behind plow 16.

Referring to FIG. 2 the table feeder 15 has a downwardly extending shaft 18 supported in conventional bearings (not shown) and rotated at suitable speed by any means familiar to those skilled in the mechanical arts. We have indicated in FIG. 2 that a ring gear 20 is attached to shaft 18 and is in mesh with a pinion 21 driven by a motor 22 through reduction gearing 23. Other effective driving means can be used.

The table 15 has a peripheral vertical flange 24 (FIG. 2) and the plow 16 is notched at 25 to receive the flange. The notch may extend along the lower edge of the plow for any length required by swing of the plow to any preadjusted position.

In FIG. 2 there is shown a fragmentary lower portion of a bin 26 disposed above hopper 10 and connected to the hopper by bolts 27 which pass through mating flanges 28 and 29 respectively on the bin and the hopper.

As best seen in FIGS. 1, 4 and 6 the plow 16 is a vertical plate hinged at 32 to a bracket 33 on the hopper wall. The plow has a pair of flanges 34 and 35 (broken line, FIG. 2) between which a pin 36 extends. An adjustable turnbuckle 37 has one of its eye bolts 38 pivoted at 36 and the other one 39 is pivoted at 40 to a bracket 41, also fixed to the hopper wall. The position of the pivot 40 is adjustable along bracket 41 and, in a well known manner, rotation of the turnbuckle 37 varies the length of the linkage and consequently the angle of the plow 16.

The novel configuration of the wall of hopper 10 will now be described. We have already pointed out that the wall is generally spiral-shaped in configuration with respect to the vertical axis of the hopper and is formed with an exit opening 11 extending vertically therethrough. As a result of the configuration of said wall, the opposed vertical sides of said opening 12 and 13 (FIGS. 1, 3, 4 and 5) are radially spaced one from the other, the side 13 thereof being disposed inwardly of the side 12 to thereby enable material to exit therethrough approximately in a direction that is at a right angle to a radius line passing through the vertical axis of said hopper. As a result the wall of hopper 10 receives a downward, inward convergence, or inclination to the vertical to provide a frusto-conical wall effect which is not a true conic contour because the inclination of the wall diminishes progressively as it extends counterclockwise (FIG. 3) around towards edge 12 at which point the wall is practically vertical. As will be noted in FIGS. 1, 3 and 4, the contour of the lower wall edge immediately above the table feeder is a spiral while the top edge (FIGS. 1 and 3) immediately beneath connecting flange 29 is circular. The progressive change in tilt or inclination of the wall to the vertical necessarily results from the change from a spiral at the bottom to a circle at the top. A series of horizontal sections taken between the lines 3—3 and 4—4 on FIG. 2 would show a series of spirals increasing in eccentricity from top to bottom.

As a consequence of the structure just described the inner wall surface of hopper 10 for the major portion of its height is substantially smooth. In our case the opening naturally results from the transition from the circle at the top to the spiral at the bottom, and the opening is in a plane intersecting the hopper axis so that material leaves the hopper in the best possible direction for operation of the table feeder.

At the bottom edge the hopper wall is reinforced by an inner collar 44 and an outer collar 45 (FIGS. 1, 4, 5 and 7). Bolts 46 retain the assembly, and, as noted in FIGS. 1 and 2, the outer collar 45 is provided with vertical slots 47 at each bolt hole to permit vertical adjustment of the collar 45 so as to secure any desired clearance between the bottom edge of the collar and the table feeder.

Operation of the device is obvious from all that has already been said. The table feeder is put into motion in the direction of the arrows A (FIGS. 3 and 4) and comminuted material, for example with about 10% moisture content, is supplied to bin 26. It moves downwardly through hopper 10, finding nothing on which to rest except the very small inward offset of collar 44 which can intercept only an infinitesimal amount. Rotation of the table feeder keeps the opening 11 clear. The rate of flow through said opening may be controlled by a suitable gate for varying the size of the opening if desired. In the forms of the invention as herein illustrated, the motor 22 is preferably of the varible speed type whereby the table feeder is rotatable at different speeds to control the rate of material flow.

From the foregoing it will be understood that the feed hopper of this invention has a curved, enclosing wall a major portion of which is conelike, though not truly conic, with said wall diverging upwardly for the most part but having one circumferentially directed edge diverging downwardly and radially outwardly relative to the other, oppositely circumferentially directed edge whereby to provide a tangentially directed port or opening for tangential flow of material from the bottom of said hopper.

Figure 8:
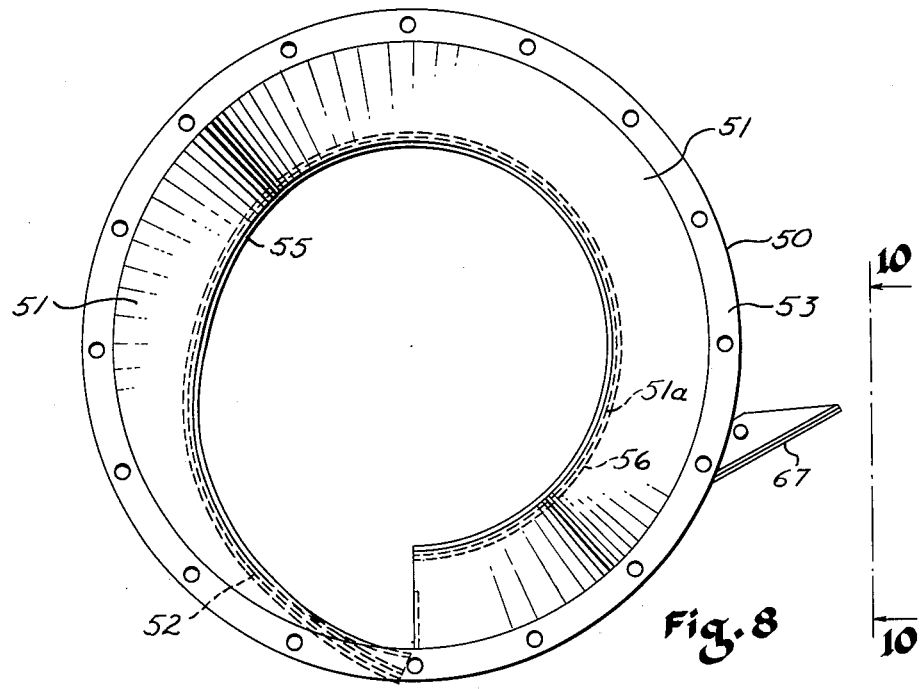
FIG. 8 is a top plan view of a modification of the hopper.
Figure 9:
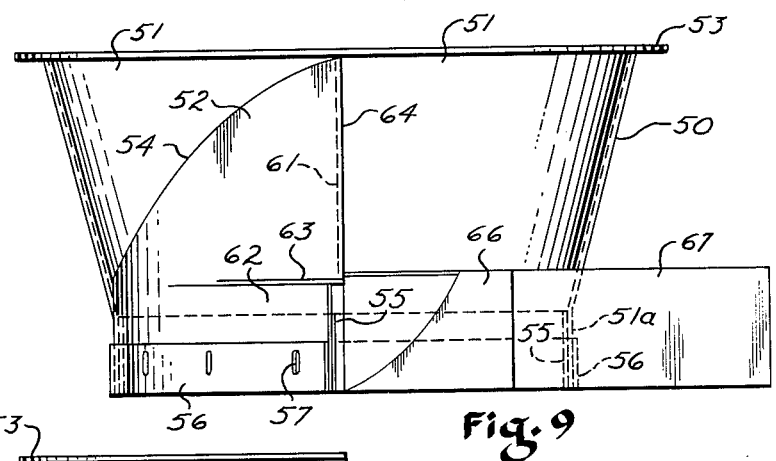
FIG. 9 is a side elevational view of the modified hopper of FIG. 8.
Figure 10:
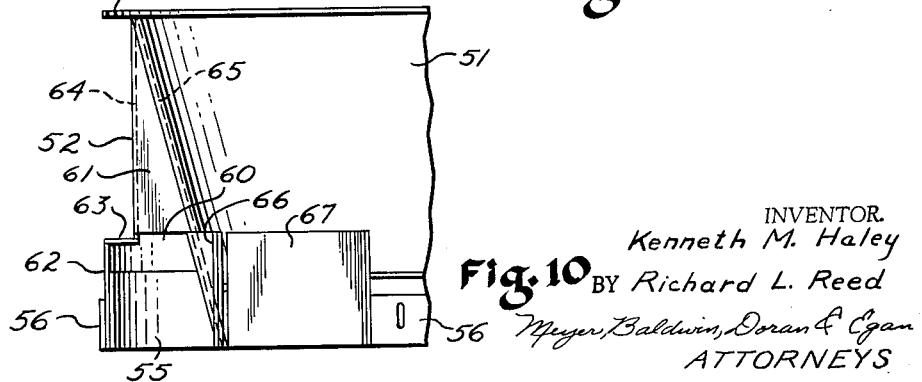
FIG. 10 is a view in side elevation as seen from the line 10—10 of FIG. 8.

The second embodiment of the invention as shown in FIGS. 8–10 comprises a hopper 50 formed by intersecting a cylindrical surface portion with a cone to obtain substantially the same generally spiral configuration or effect as that discussed in connection with the first embodiment of the invention. The hopper 50 has a conical portion 51 with the wall thereof converging downwardly in a uniform manner throughout the circumferential extent of said conical portion. A cylindrical portion 52 extends from the upper edge of the cone, adjacent to an upper connecting flange 53 of the hopper, downwardly and circumferentially generally around the outer periphery of the hopper whereby it defines approximately 90° of the bottom, open end of the hopper. The cylindrical portion 52 also turns radially inwardly of the hopper 50, in a clockwise direction as seen in FIG. 8, whereby it ultimately merges with the lower, smaller end of said hopper. The conical portion 51 and the cylindrical portion 52 are welded or otherwise suitably secured together along their intersecting edges as indicated at 54. At the bottom edge, the conical portion 51 has a cylindrical wall portion 51a which merges with the cylindrical portion 52 with said portions being reinforced, as in the first embodiment, by an inner collar 55 and an outer collar 56. The outer collar 56 is substantially identical with the outer collar 45 of the first embodiment and is provided with vertical slots 57 in the same manner and for the same purpose as the vertical slots 47 of said first embodiment.

The intersection of a cylinder with a cone as above described causes the lower end portion of the hopper to define a spiral-like shape similar to that defined by the bottom edge of the hopper in the first embodiment of the invention. As shown in FIG. 10, this construction provides an upwardly tapering opening 60, an upper end portion of which may be closed by a plate 61 of triangular shape. This leaves an exit opening of nearly rectangular shape which may be further enlarged in a horizontal direction by radially, outwardly stepping the lower end portion of the cylindrical portion 52, as indicated at 62, and covering the stepped out portion with a semicrescent shaped, horizontal plate 63. The inner and outer collars 55 and 56 are secured to and follow the stepped out portion 62.

Thus, it will be seen that the cylindrical portion 52 provides a vertical wall edge shown at 64 which converges upwardly relative to an oblique, inner wall edge 65 of the conical portion 51 which said inner wall edge has the natural slant or tilt of the periphery of said conical portion. The opening defined below the plate 61 provides a tangential outlet port to afford a tangential flow at the bottom of the hopper onto the table feeder 15. A baffle plate 66, similar to the baffle plate 17 of the first embodiment, is provided adjacent to the inner, oblique wall edge 65, with a plow or scraper 67 being connected adjacent to said baffle plate in the manner hereinabove described in connection with the first embodiment of the invention.

The operation of the second embodiment is exactly the same as that of the first embodiment. As the table feeder rotates, the comminuted material moves downwardly through the hopper 50 neither the conical portion 51 nor the cylindrical portion 52 providing any obstruction to its downward movement as the material at the bottom of the hopper moves naturally through the tangential opening 60.

What is claimed is:
1. A feed hopper adapted to deliver material to an underlying conveyor, said feed hopper comprising an enclosing wall which is generally spiral in a horizontal section, a major portion of said wall being upwardly divergent from a smaller diameter to a larger diameter, a minor portion of said wall diverging downwardly and radially outwardly relative to said major portion with said major and minor portions having oppositely directed, laterally spaced edges generally defining a vertical plane radiating from the axis of said hopper, said edges providing an exit opening in said hopper to enable material to exit therethrough approximately in a direction that is at a right angle to a radius line passing through the vertical axis of said hopper.

2. A feed hopper having a generally vertical axis and adapted to deliver material to an underlying conveyor, said feed hopper comprising a curved, enclosing wall generally spiral in configuration, a portion of said wall being generally conelike and diverging upwardly, another portion of said wall diverging downwardly and radially outwardly relative to said first mentioned portion and generally parallel to said axis with said first and second mentioned portions having circumferentially oppositely directed, radially spaced wall edges, said edges being spaced apart radially with respect to the axis of the hopper to define an exit opening in said spiral hopper wall effective to guide said material from the bottom of the hopper in a direction at right angles to a radius passing through said axis.

3. A feed hopper as is defined in claim 2 and wherein the exit opening increases in its width from top to bottom.

4. The combination of a feed hopper and an underlying, rotating conveyor, said feed hopper comprising a curved, enclosing wall generally spiral in configuration, a portion of said wall being generally conelike and diverging upwardly, another portion of said wall diverging downwardly and radially outwardly relative to said first mentioned portion and generally parallel to said axis with said first and second mentioned portions having circumferentially oppositely directed, radially spaced wall edges, said edges being spaced apart radially with respect to the axis of the hopper to define an exit opening in said spiral hopper wall effective to guide said material from the bottom of the hopper in a direction at right angles to a radius passing through said axis and in the direction of rotation of the rotating conveyor.

5. The combination of a feed hopper and an underlying, rotating conveyor as defined in claim 4 and wherein the upper peripheral edge of the hopper is circular and the lower peripheral edge has a spiral contour.

6. The combination of a feed hopper and an underlying, rotating conveyor as defined in claim 4 and wherein a vertically adjustable collar is disposed about the lower edge of the hopper wall.

7. The combination of a feed hopper and an underlying, rotating conveyor as is defined in claim 4 and wherein the wall of the feed hopper comprises a conical wall portion and a cylindrical wall portion defining the intersection of a cone and a cylinder generated about parallel axes.

8. The combination of a feed hopper and an underlying, rotating conveyor as is defined in claim 4 and wherein the inner surface of the hopper wall is substantially smooth and uninterrupted from top to bottom.

References Cited by the Examiner
UNITED STATES PATENTS 3,083,471  4/1963  Huntington _____ 222—410 X

FOREIGN PATENTS 266,805  5/1950  Switzerland.
580,076  8/1946  Great Britain.

RAPHAEL M. LUPO, *Primary Examiner.*

N. STACK, *Assistant Examiner.*